Sept. 23, 1947.  R. W. SCHUCK  2,427,748
BEARING FOR VERTICAL SHAFTS
Filed July 9, 1945  2 Sheets-Sheet 1

WITNESSES:

INVENTOR
Raymond W. Schuck.
BY
ATTORNEY

Sept. 23, 1947.  R. W. SCHUCK  2,427,748
BEARING FOR VERTICAL SHAFTS
Filed July 9, 1945  2 Sheets-Sheet 2

WITNESSES:

INVENTOR
Raymond W. Schuck.
BY
ATTORNEY

Patented Sept. 23, 1947

2,427,748

UNITED STATES PATENT OFFICE 2,427,748

BEARING FOR VERTICAL SHAFTS

Raymond W. Schuck, Pittsburgh, Pa., assignor to Westinghouse Electric Corporation, East Pittsburgh, Pa., a corporation of Pennsylvania Application July 9, 1945, Serial No. 603,929

11 Claims. (Cl. 308—134.1)

1

The present invention relates to bearings for vertical shafts and, more particularly, to improved means for lubricating ball bearings for vertical shafts, and for protecting the bearings against corrosion when the shaft is at rest.

The invention is especially adapted for such applications as vertical-shaft pump motors, although its usefulness is obviously not restricted to this particular application. Pump motors sometimes remain idle for relatively long periods of time, and there is considerable danger of corrosion of the balls and races of the ball bearings by moisture condensing on them when the motor is idle unless some means is provided for protecting the bearings. This may be done by providing enough oil in each bearing to completely submerge the bearing, so that the balls and races are kept covered with oil and thus protected against moisture. This requires a considerable excess of oil over that required merely for lubrication, however, and, when the motor is running, this large amount of oil in the bearing results in excessive churning and splashing of the oil, which causes oil and oil vapor to get into the motor itself, where it is deposited on the windings and has a harmful effect on the insulation. The excessive churning of the oil also results in increased temperature rise of the bearing. Attempts have been made to minimize these undesirable effects by reducing the amount of oil in the bearing so that the oil level when the motor is at rest is somewhat below the top of the balls. This expedient, of course, reduces the amount of oil and, therefore, the churning and splashing, but it does not completely protect the bearing against corrosion when the motor is at rest and is not a desirable solution of the problem.

The principal object of the present invention is to provide a bearing assembly for vertical shafts in which the bearing is fully protected against corrosion when the shaft is at rest, and in which only enough oil for lubrication is supplied to the bearing when the shaft is rotating, so that there is no excess oil during operation and no churning or splashing of the oil.

Another object of the invention is to provide a bearing assembly for a vertical shaft in which the bearing is submerged in oil when the shaft is at rest, and in which the excess oil is withdrawn from the bearing when the shaft starts to rotate, and only enough oil for adequate lubrication is supplied to the bearing during rotation of the shaft.

A further object of the invention is to provide a bearing assembly for vertical shafts in which

2 oil is supplied to the bearing from a reservoir, and in which means are provided for regulating and controlling the flow of oil to the bearing during rotation of the shaft so as to provide only enough oil for adequate lubrication of the bearing, and which is so designed that the bearing receives an adequate supply of oil even if the oil level in the reservoir should fall entirely below the bearing.

Other objects and advantages of the invention will be apparent from the following detailed description, taken in connection with the accompanying drawings, in which.

Figure 1:
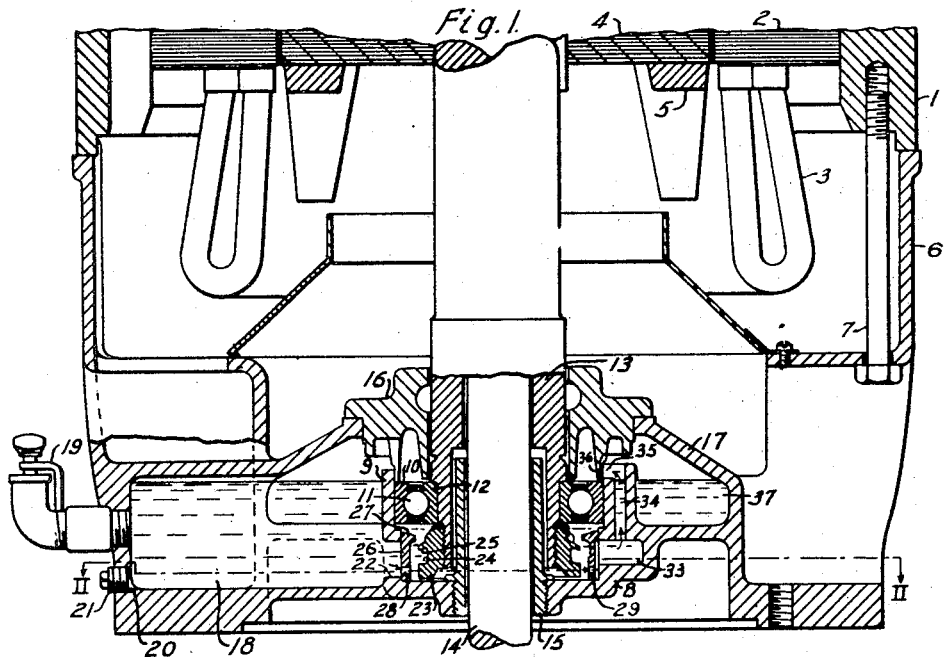
Figure 1 is a vertical sectional view of the lower part of a vertical electric motor embodying the bearing assembly of the present invention, the section being taken approximately on the line I—I of Fig. 2.

The invention is shown in the drawings embodied in a bearing assembly for a vertical electric motor, such as may be used for a pump drive. The motor includes a frame member 1 in which is supported a laminated stator core 2 having suitable windings 3 thereon. The motor also includes a laminated rotor member 4 having a squirrel-cage winding, indicated at 5, which may have fan blades for circulating ventilating air. The motor also has a lower end bracket 6 which may be secured to the frame 1 by means of bolts 7. Only the lower end of the motor has been shown, but it will be understood that the upper end of the motor is closed by a suitable bracket, and that the upper bearing is generally similar to the lower bearing described in detail hereinafter.

The end bracket 6 has a central hub portion or bearing support 8, which includes a circular wall portion 9 in which the outer race 10 of a ball bearing 11 is supported. The ball bearing 11 is shown as a radial bearing, but it will be obvious that it might be a combined radial and thrust bearing, or any other type of antifriction bearing. The inner race 12 of the bearing 11 is pressed on a quill shaft 13 in which the motor shaft 14 is secured. A vertical tubular member 15 is secured in the bearing support 8 and extends upward in the space between the quill 13 and shaft 14 to a point somewhat above the bearing 11. It will be observed that the circular wall 9 of the bearing support 8 and the tubular member 15 form a lubricant-receiving bearing chamber in which the bearing 11 is supported and enclosed, and which extends some distance below the bearing. The bearing chamber is closed at the top by a bearing cap 16.

Figure 2:
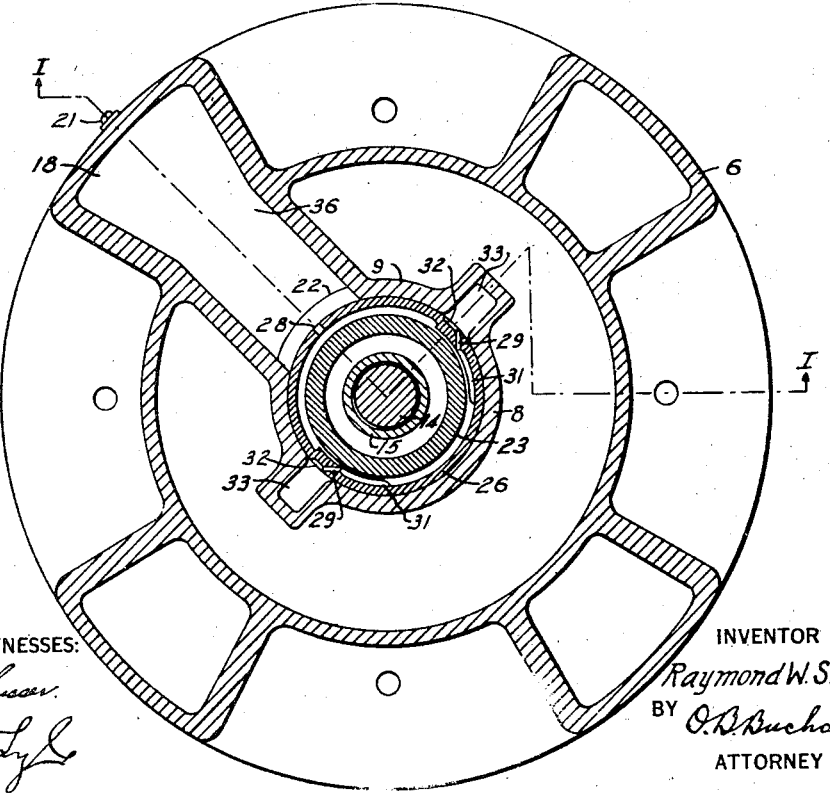
Fig. 2 is a transverse sectional view approximately on the line II—II of Fig. 1.

The bearing support 8 also includes an annular lubricant reservoir 17 extending around the outside of the bearing chamber. The reservoir 17 has a portion 18 at one side which extends out to the periphery of the end bracket 6 and down to the bottom of the bracket, as clearly shown in Figs. 1 and 2. An oiler 19 of any suitable type extends through the wall of the bracket into the portion 18 of the reservoir 17 to supply oil 37 thereto, and the oiler is adapted to maintain an oil level in the reservoir 17 which is above the top of the bearing 11, as shown in Fig. 1. A drain hole 20 may be provided in the bottom of the portion 18 of the reservoir 17 for the purpose of draining the oil when desired, this hole being normally closed by a plug 21. The circular wall 9 of the bearing support has a relatively large opening 22 communicating with the portion 18 of the reservoir 17 so that oil may flow from the reservoir into the bearing chamber, and it will be seen that when the shaft is at rest, oil flowing into the bearing chamber will rise to the level of the oil in the reservoir 17, so that the bearing 11 will be completely submerged in oil.

Pumping means are provided in the bearing chamber below the bearing 11 to pump excess oil from the bearing when the shaft is rotating, and to control and regulate the flow of oil to the bearing. This pumping means includes an impeller element 23 secured to the quill 13 below the bearing 11. The impeller 23 is an annular member threaded, or otherwise secured, on the quill 13 in which the shaft 14 is supported, and the impeller has an annular groove 24 extending around it to increase its effectiveness in pumping the oil. The upper side of the annular groove 24 forms a flange 25 which is inclined downwardly, as clearly shown in Fig. 1.

Figure 3:
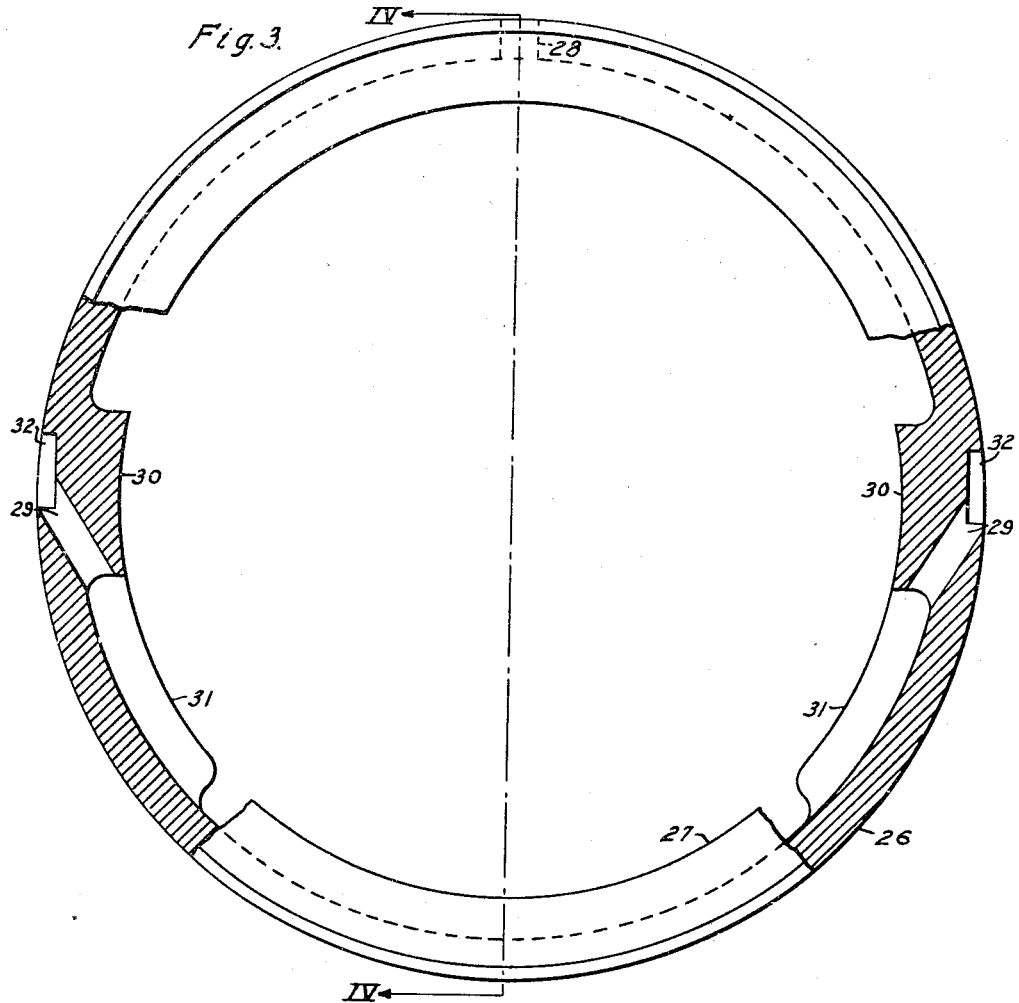
Fig. 3 is a plan view, partly in section, of a regulator element.
Figure 4:
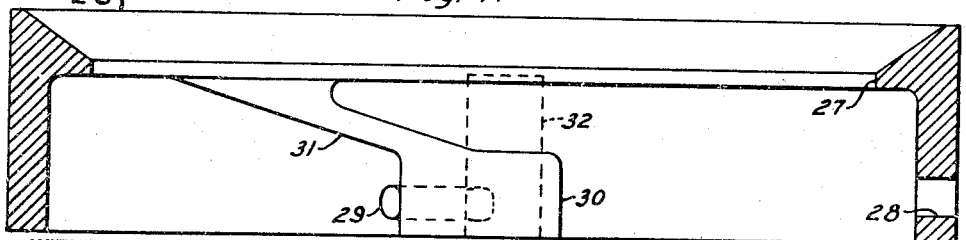
Fig. 4 is a sectional view on the line IV—IV of Fig. 3.

The flow of oil is controlled and regulated by a regulator member 26 which surrounds the impeller 23. As more clearly shown in Figs. 3 and 4, the regulator 26 is an annular member having an inwardly and downwardly extending flange 27 at the top thereof. The regulator 26 has an inlet opening 28 in one side, and it is positioned in the bearing chamber with the opening 28 opposite the opening 22 in the wall 9 of the bearing support, so that oil flows from the reservoir into the bearing chamber through the inlet opening 28. The regulator member 26 is shown as having two oppositely positioned discharge openings 29 in it. It is to be understood, however, that only one discharge opening might be provided. As shown in the drawings, each of the discharge openings 29 extends angularly through the wall of the regulator 26 and through a boss 30 on the lower part of the inner surface of the regulator. An inclined rib 31 is formed integrally on the inner wall of the regulator and extends from the boss 30 immediately above the discharge opening 29 up to the flange 27 at the top of the regulator, as clearly seen in Fig. 4. A vertical groove 32 is formed in the outer surface of the regulator 26 at the outer end of each of the discharge openings 29, and the grooves 32 extend upward nearly to the top of the regulator member. When the regulator is provided with two discharge openings 29 and corresponding ribs 31, the openings 29 and ribs 31 are oppositely directed, as shown in the drawings, so as to be effective in opposite directions of rotation of the motor. If the motor is not reversible, only one discharge opening 29 need be provided in the regulator.

The bearing support 8 has recesses 33 in the wall 9 opposite each of the discharge openings 29 in the regulator 26, and a vertical passage or duct 34 leads upward from each of the recesses 33 and extends above the normal level of the oil in the reservoir 17. A groove 35 extends from the top of the passage 34 toward the shaft, and a hole 36 is provided in the bearing cap 16 opposite the groove 35 to permit oil to flow into the bearing chamber above the bearing.

When the motor is at rest, the level of the oil in the bearing chamber is the same as the oil level in the reservoir 17, so that when the oil 37 in the reservoir is maintained at its normal level, as shown in the drawings, the bearing 11 is completely submerged in oil, and the balls and races are thus protected from corrosion. When the shaft starts to rotate, the impeller 23, which rotates with the shaft, pumps the oil from the bearing chamber back to the reservoir. The annular groove 24 in the impeller member facilitates this pumping action by increasing the surface area of the impeller which is in contact with the oil, so as to increase its effectiveness in causing swirling and circumferential movement of the oil. As the oil moves circumferentially in the space between the impeller 23 and the regulator member 26, it encounters the inclined rib 31 which is inclined downwardly in the direction of movement of the oil. The rib 3 directs the oil downwardly into the discharge opening 29 and increases the pressure of the oil, so that the maximum pressure is built up at the entrance of the discharge opening 29. The oil thus passes through the opening 29 into the vertical groove 32 and into the recess 33 in the bearing support 8.

The high pressure developed in the oil adjacent the discharge opening, by means of the rib 31, forces the oil upwardly through the vertical passage 34, from which it overflows into the reservoir 17, as shown by the arrows in Fig. 1. As the oil reaches the top of the vertical passage 34, some of the oil is diverted through the groove 35 and opening 36 in the bearing cap, the amount of oil thus diverted being determined by the size of the opening 36. The oil passages and the opening 36 are so proportioned that the amount of oil which flows through the opening 36 into the bearing 11 is sufficient to adequately lubricate the bearing, but without any substantial excess of oil, so that excess oil is pumped back to the reservoir and only enough oil for lubrication reaches the bearing. The oil flowing down through the bearing 11 absorbs heat from the bearing as well as lubricating it, and when it reaches the lower part of the bearing chamber, it comes in contact with the cooler oil which continuously flows in from the reservoir 17 through the openings 22 and 28, and thus a large part of the heat of the bearing is dissipated in the oil.

It should now be apparent that a bearing assembly for vertical shafts has been provided which has many advantages. Thus when the shaft is at rest, the bearing is completely protected against corrosion, since it is entirely submerged in oil, and thus the balls and races are protected from condensed moisture or any other source of corrosive action. When the shaft starts to rotate, however, the pumping means in the lower part of the bearing chamber pumps the excess oil out of the bearing chamber back into the reservoir 17, as described above, and only enough oil is fed to the bearing through the openings 35 and 36 to adequately lubricate the bearing, but without any substantial excess. In this way, churning and splashing of the oil are substantially eliminated but adequate lubrication is obtained, and the bearing is completely protected against corrosion when the shaft is at rest.

The construction described also has certain other advantages. It will be noted that the inwardly extending flange 27 of the regulator member 26 extends over the flange 25 on the upper edge of the impeller 23, and that these flanges are vertically offset from each other. This construction prevents the oil which is swept around by the impeller from splashing up into the bearing 11 from below, and thus prevents excess oil from reaching the bearing in this way. It is also to be noted that since the pumping parts are below the bearing and substantially at the level of the lowest part of the oil reservoir, an adequate supply of oil will be supplied to the bearing even if the oil level in the reservoir 17 should fall far below its normal position, for any reason. As long as any oil at all flows from the reservoir through the inlet opening 28, the impeller 23 will continue to pump this oil to the bearing in the manner described, so that the bearing will be adequately lubricated.

It will be understood, of course, that although a specific embodiment of the invention has been shown and described for the purpose of illustration, the invention is not limited to the particular details of construction shown. Thus, as indicated above, only one outlet opening 29 in the regulator element may be used where the shaft is intended to rotate only in one direction. It will also be apparent that the invention is of general application to antifriction bearings for vertical shafts, and is not restricted to the particular embodiment shown in an electric motor. It is to be understood, therefore, that the invention is not limited to the particular details of construction shown and described, but in its broadest aspects it includes all equivalent embodiments and modifications which come within the scope of the appended claims.

I claim as my invention:

1. In combination, a bearing for a vertical shaft, a lubricant reservoir for supplying lubricant to said bearing, said reservoir being disposed to cause the lubricant to submerge the bearing when the shaft is at rest, pumping means operative when the shaft is rotating for pumping lubricant from the bearing to the reservoir, and means for diverting a part of the lubricant pumped from the bearing before it reaches the reservoir and for directing said diverted lubricant back to the bearing to lubricate it.

2. In combination, a bearing for a vertical shaft, a lubricant reservoir for supplying lubricant to said bearing, said reservoir being disposed to cause the lubricant to submerge the bearing when the shaft is at rest, pumping means on the shaft below the bearing for pumping lubricant from the bearing to the reservoir, and means for diverting a part of the lubricant pumped from the bearing before it reaches the reservoir and for directing said diverted lubricant back to the bearing to lubricate it.

3. In combination, a bearing for a vertical shaft, a lubricant reservoir for supplying lubricant to said bearing, said reservoir being disposed adjacent the bearing and having an opening below the bearing through which lubricant flows to the bearing, said reservoir being adapted to be filled with lubricant to a level such that lubricant flowing to the bearing rises above the top of the bearing when the shaft is at rest, pumping means operative when the shaft is rotating for pumping lubricant from the bearing to the reservoir, and means for diverting a part of the lubricant pumped from the bearing and directing said diverted part of the lubricant back to the bearing to lubricate it.

4. In combination, a bearing for a vertical shaft, a lubricant reservoir for supplying lubricant to said bearing, said reservoir being disposed adjacent the bearing and having an opening below the bearing through which lubricant flows to the bearing, said reservoir being adapted to be filled with lubricant to a level such that lubricant flowing to the bearing rises above the top of the bearing when the shaft is at rest, pumping means on the shaft below the bearing for pumping lubricant from the bearing to the reservoir when the shaft is rotating, and means for diverting a part of the lubricant pumped from the bearing and directing said diverted part of the lubricant back to the bearing to lubricate it.

5. In combination, a bearing for a vertical shaft, a lubricant reservoir for supplying lubricant to said bearing, said reservoir being disposed adjacent the bearing and having an opening below the bearing through which lubricant flows to the bearing, said reservoir being adapted to be filled with lubricant to a level such that lubricant flowing to the bearing rises above the top of the bearing when the shaft is at rest, pumping means below the bearing for pumping lubricant from the bearing to the reservoir when the shaft is rotating, said pumping means including an impeller element mounted on the shaft to rotate therewith, said impeller element having an annular groove about its periphery, and means for diverting a part of the lubricant pumped from the bearing and directing said diverted part of the lubricant back to the bearing to lubricate it.

6. In combination, a bearing for a vertical shaft, means forming a lubricant-receiving chamber around the bearing, a lubricant reservoir for supplying lubricant to the bearing, said reservoir communicating with the lower part of said chamber below the bearing to permit lubricant to flow from the reservoir to the chamber, said reservoir being adapted to be filled with lubricant to a level such that lubricant rises in the chamber to submerge the bearing when the shaft is at rest, pumping means in the chamber below the bearing for pumping lubricant from the chamber when the shaft is rotating, and means for directing said lubricant pumped from the chamber back to the reservoir and for causing a part of said lubricant to be diverted into the bearing to lubricate it.

7. In combination, a bearing for a vertical shaft, means forming a lubricant-receiving chamber around the bearing, a lubricant reservoir for supplying lubricant to the bearing, said reservoir communicating with the lower part of said chamber below the bearing to permit lubricant to flow from the reservoir to the chamber, said reservoir being adapted to be filled with lubricant to a level such that lubricant rises in the chamber to submerge the bearing when the shaft is at rest, an impeller element mounted on the shaft in the chamber below the bearing for pumping lubricant from the chamber when the shaft is rotating, means for directing said lubricant back to the reservoir, and means for diverting a part of said lubricant and causing it to flow into the bearing to lubricate it.

8. In combination, a bearing for a vertical shaft, means forming a lubricant-receiving chamber around the bearing, a lubricant reservoir for supplying lubricant to the bearing, said reservoir communicating with the lower part of said chamber below the bearing to permit lubricant to flow from the reservoir to the chamber, said reservoir being adapted to be filled with lubricant to a level such that lubricant rises in the chamber to submerge the bearing when the shaft is at rest, an impeller element mounted on the shaft in the chamber below the bearing for pumping lubricant from the chamber when the shaft is rotating, an annular member in the lower part of the chamber surrounding the impeller for regulating the flow of lubricant, said annular member having an inlet opening for admitting lubricant from the reservoir to the chamber and having an outlet opening for lubricant pumped from the chamber by the impeller element, and duct means extending from the outlet opening of said annular member for returning lubricant pumped from the chamber to the reservoir, said duct means including means for diverting a part of said lubricant into the bearing to lubricate it.

9. In combination, a bearing for a vertical shaft, means forming a lubricant-receiving chamber around the bearing, a lubricant reservoir for supplying lubricant to the bearing, said reservoir communicating with the lower part of said chamber below the bearing to permit lubricant to flow from the reservoir to the chamber, said reservoir being adapted to be filled with lubricant to a level such that lubricant rises in the chamber to submerge the bearing when the shaft is at rest, an impeller element mounted on the shaft in the chamber below the bearing for pumping lubricant from the chamber when the shaft is rotating, an annular member in the lower part of the chamber surrounding the impeller for regulating the flow of lubricant, said annular member having an inlet opening for admitting lubricant from the reservoir to the chamber and having an outlet opening for lubricant pumped from the chamber by the impeller element, means on said annular member for directing the lubricant into the outlet opening and for increasing the pressure of the lubricant adjacent the outlet opening, vertical duct means extending from the outlet opening for returning lubricant pumped from the chamber to the reservoir, and means for diverting a part of said lubricant from the duct means into the upper part of the chamber to flow into the bearing and lubricate it.

10. In combination, a bearing for a vertical shaft, means forming a lubricant-receiving chamber around the bearing, a lubricant reservoir for supplying lubricant to the bearing, said reservoir communicating with the lower part of said chamber below the bearing to permit lubricant to flow from the reservoir to the chamber, said reservoir being adapted to be filled with lubricant to a level such that lubricant rises in the chamber to submerge the bearing when the shaft is at rest, an impeller element mounted on the shaft in the chamber below the bearing for pumping lubricant from the chamber when the shaft is rotating, an annular member in the lower part of the chamber surrounding the impeller for regulating the flow of lubricant, said annular member having an inlet opening for admitting lubricant from the reservoir to the chamber and having an outlet opening for lubricant pumped from the chamber by the impeller element, an inclined rib on the inside surface of said annular member, said rib extending downwards from the top of the annular member to adjacent the outlet opening to direct the lubricant into the outlet opening and to increase its pressure, vertical duct means extending from the outlet opening for returning lubricant pumped from the chamber to the reservoir, and means for diverting a part of said lubricant from the duct means into the upper part of the chamber to flow into the bearing and lubricate it.

11. In combination, a bearing for a vertical shaft, means forming a lubricant-receiving chamber around the bearing, a lubricant reservoir for supplying lubricant to the bearing, said reservoir communicating with the lower part of said chamber below the bearing to permit lubricant to flow from the reservoir to the chamber, said reservoir being adapted to be filled with lubricant to a level such that lubricant rises in the chamber to submerge the bearing when the shaft is at rest, an impeller element mounted on the shaft in the chamber below the bearing for pumping lubricant from the chamber when the shaft is rotating, an annular member in the lower part of the chamber surrounding the impeller for regulating the flow of lubricant, said annular member having an inlet opening for admitting lubricant from the reservoir to the chamber and having an outlet opening for lubricant pumped from the chamber by the impeller element, said annular member having an inwardly extending flange portion at its top offset vertically from the upper edge of the impeller element, the annular member also having an inclined rib on its inner surface extending downwardly from said flange to adjacent the outlet opening to direct the lubricant into the outlet opening and to increase its pressure, vertical duct means extending from the outlet opening for returning lubricant pumped from the chamber to the reservoir, and means for diverting a part of said lubricant from the duct means into the upper part of the chamber to flow into the bearing and lubricate it.

RAYMOND W. SCHUCK.

REFERENCES CITED

The following references are of record in the file of this patent:

UNITED STATES PATENTS

| Number | Name | Date |
| --- | --- | --- |
| 1,277,439 | Long | Sept. 3, 1918 |
| 2,010,896 | Richard | Aug. 13, 1935 |